United States Patent Office 3,290,576
Patented Dec. 6, 1966

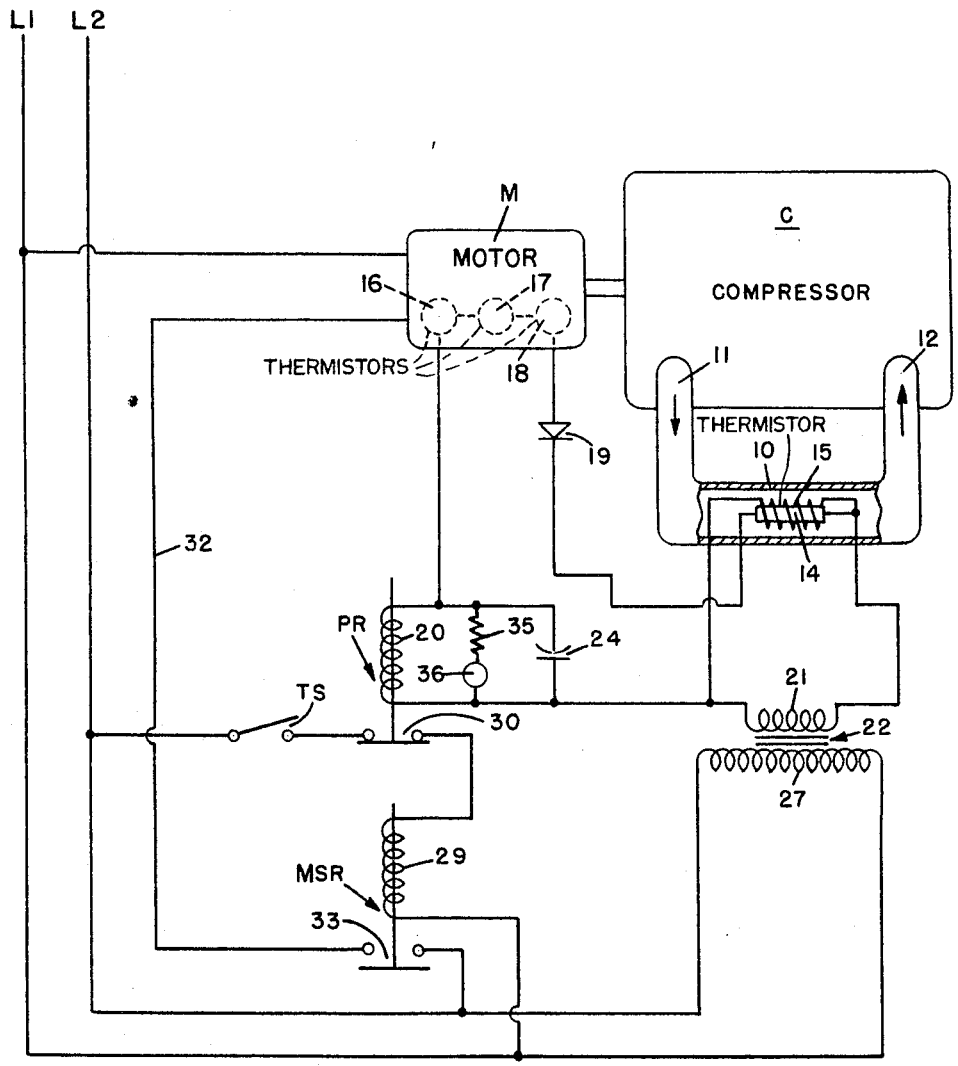

3,290,576
DETECTORS OF FLUID FLOW
Erik H. Jensen and George L. Drinkard, Jr., Staunton, Va., assignors to Westinghouse Electric Corporation, Pittsburgh, Pa. a corporation of Pennsylvania
Filed May 12, 1964, Ser. No. 366,823
4 Claims. (Cl. 318—471)

This invention relates to fluid flow detectors, and relates more particularly to detectors of oil flow in lubricating systems of refrigerant compressors, and to safety circuits including such detectors.

Thermistors having positive temperature coefficients of resistance, and known as "PTC thermistors," have electrical resistances which increase rapidly with their temperatures near upper critical temperatures. Such a thermistor when connected to an electric power source will become heated until its heat loss, its resistance and the current it draws are balanced. When such a heated thermistor is inserted in a flowing fluid, it may have as a result of being cooled by the fluid, a resistance, for example, of one hundred ohms. When the fluid flow stops, the thermistor though no longer being cooled, may have, for example, a resistance of three thousand ohms. Such a thermistor can also be heated by a resistor in contact with it and through which current flows, both the resistor and the thermistor being cooled when the fluid flows.

This invention makes use of such a heated thermistor to determine whether or not a fluid flows. In one embodiment of this invention, a PTC thermistor and its heater resistor are placed in an oil flow line of a refrigerant compressor. The thermistor is in series with the energizing coil of a protective relay and an electric power source. The resistor is connected across the power source. The protective relay has a switch connecting the energizing coil of a starter relay of the motor of the compressor to the power source. With the thermistor and the resistor cooled by the flow of oil over their surfaces, the resistance of the thermistor is relatively low, and the protective relay is energized. When the flow of oil stops, the thermistor is heated to a critical temperature, and its resistance is relatively high, decreasing the current through the energizing coil of the protective relay so that the latter is deenergized and opens its switch. The later deenergizes the motor starter relay which opens its switch or switches, stopping the compressor motor.

An object of this invention is to use a thermistor to determine the presence or absence of a fluid flow.

Another object of this invention is to use a heated thermistor exposed to a flowing fluid, to operate a safety circuit when the flow ceases.

This invention will now be described with reference to the annexed drawing which is a diagrammatic view of a refrigeration system embodying this invention.

A refrigerant compressor C driven by an electric motor M, has a tube 10 with an oil inlet 11, and an oil outlet 12, connecting with the usual oil pump which is not shown, of the compressor. The tube 10 can be external the compressor as shown, or can be within the compressor. Contained within the tube 10 so as to be immersed in the oil flowing therethrough, are a thermistor 14 having a positive temperature coefficient of resistance, and a heater resistor 15 in heat exchange contact with the thermistor. The resistor 15 has a glass or other electrically insulating coating which conducts heat. In contact with the windings of the motor M as disclosed in detail in the copending application of E. H. Jensen, Serial No. 66,537, filed November 1, 1960, and which issued as Patent No. 3,155,877 on November 3, 1964, are thermistors 16, 17 and 18 which are similar to the thermistor 14. The thermistors 14, 16, 17 and 18 are connected in series with diode 19 and energizing coil 20 of protective relay PR to secondary winding 21 of step-down transformer 22. The resistor 15 is shunted across the winding 21. Capacitor 24 is shunted across the relay coil 20 for smoothing out DC pulses. Primary winding 27 of the transformer 22 is connected to electric supply lines L1 and L2. Energizing coil 29 of motor starter relay MSR is connected in series with normally closed switch 30 of the relay PR, and switch TS which may be a switch of a thermostat, to the supply lines L1 and L2. The motor M is connected to the line L1, and by conductor 32 to switch 33 of the relay MSR. The switch 33 is connected to the line L2. An indicator light bulb 36 in series with a resistor 35 is shunted across the relay coil 20.

In operation, the relay PR is normally energized, and its switch 30 is normally closed. When the switch TS is closed, the relay MSR is energized through the switch TS and the closed switch 30, and closes its switch 33, starting the compressor motor M. With the motor M in operation, lubricating oil of the compressor flows through the tube 10 in contact with the thermistor 14 and the heater resistor 15. Current from the transformer winding 21 flows through the resistor 15, heating the latter. Current less than that flowing through the resistor 15, flows through the thermistor 14, heating the latter. With the motor M in normal operation, the thermistors 16, 17 and 18 are not excessively heated. With the compressor C in normal operation, the thermistor 14 and the resistor 15 are cooled by the flow of oil over their surfaces so that they are not excessively heated. With the motor M and the compressor in normal operation, the resistances of the thermistors 14, 16, 17 and 18 are sufficiently low to maintain sufficient current flowing through the coil 20 of the relay PR to maintain the latter energized. The bulb 36 glows at this time.

If the motor M should overheat to a critical temperature, the resistances of the thermistors 16, 17 and 18 would increase sufficiently to decrease the current flowing through the coil 20 of the relay PR sufficiently to deenergize the latter so that its switch 30 would open and deenergize the relay MSR which would open its switch 31 and stop the compressor motor M. The indicator bulb 36 would go out.

If the flow of oil through the tube 10 should stop, the thermistor 14 would be so heated by the flow of current through it, and by the resistor 15, that is resistance would increase sufficiently to decrease the current flowing through the coil 20 of the relay PR sufficiently to deenergize the latter so that its switch 30 would open and deenergize the relay MSR which would open its switch 31 and stop the compressor motor M. The indicator bulb 36 would go out.

What is claimed, is:

1. A fluid flow detector comprising a thermistor, a heater resistor in heat exchange contact with said thermistor, means for passing a moving fluid in contact with said thermistor and said resistor for cooling said thermistor and said resistor, electrical supply connections, said resistor being connected to said connections, a circuit connecting said thermistor to said connections for flowing current through said thermistor for heating said thermistor, said thermistor having one resistance and the current in said circuit flowing through said thermistor having a first value when said fluid is flowing, said thermistor having a different resistance and the current in said circuit flowing through said thermistor having a second value when said fluid is not flowing, and means in said circuit in series with said thermistor and responsive to current flowing through said thermistor, said means having one condition when said current has said first value, and having an opposite condition when said current has said second value.

2. An oil flow detector for a refrigerant compressor, said compressor having an electric driving motor, and having a passage through which lubricating oil flows when said compressor is in normal operation, said detector comprising a thermistor in said passage cooled by oil flowing in said passage, electrical supply connections connected to said motor, a heater resistor in said passage in heat exchange contact with said thermistor, said resistor being connected to said connections, a circuit connecting said thermistor to said connections, a safety relay in said circuit in series with said thermistor, the current flowing in said circuit having one value when said thermistor and said resistor are cooled by oil flowing in said passage, and having a different value when oil is not flowing in said passage, said relay having a switch which is in one position when said current has said one value, and which is in another position when said current has said different value, and means including said switch for disconnecting said motor from said connections when said switch is in said other position.

3. An oil flow detector for a refrigerant compressor, said compressor having an electric driving motor, and having a passage through which lubricating oil flows when said compressor is in normal operation, said detector comprising a PTC thermistor in said passage cooled by oil flowing in said passage, electric supply connections connected to said motor, a heater resistor in said passage in heat exchange contact with said thermistor, said resistor being connected to said connections, a circuit connecting said thermistor to said connections, a safety relay in said circuit in series with said thermistor, said relay having a switch that is closed when said thermistor and said resistor are cooled by oil flowing in said passage, and which opens when oil is not flowing in said passage, and means including said switch for disconnecting said motor from said connections when said switch opens.

4. An oil flow detector for a refrigerant compressor having an electric driving motor, having a passage through which lubricating oil flows when said compressor is in operation, having a first PTC thermistor in heat exchange contact with said motor, having a protective relay with an energizing coil, having electric supply connections, and having a circuit connecting said coil and thermistor in series to said connections, said detector comprising a second PTC thermistor in said passage and a heater resistor in said passage in heat exchange contact with said second transistor, and cooled by oil flowing in said passage, said resistor being connected to said connections, said second thermistor being connected in said circuit in series with said coil and said first thermistor, said relay having a switch that is closed when the temperature of said motor is normal, and when oil flows in said passage, and that opens when the temperature of said motor has increased to an abnormal temperature, and when there is no oil flow in said passage, and means including said switch for connecting said motor to said connections.

References Cited by the Examiner

UNITED STATES PATENTS

| | | |
|---|---|---|
| 2,475,343 | 7/1949 | Wellman. |
| 2,813,237 | 11/1957 | Fluegel et al. _____ 73—204 X |
| 2,818,535 | 12/1957 | Skeats et al. _____ 318—471 X |
| 2,831,351 | 4/1958 | Jacobson _____ 73—204 |
| 2,859,617 | 11/1958 | Adams _____ 73—204 |
| 3,064,444 | 11/1962 | Kyle _____ 318—471 X |
| 3,102,677 | 9/1963 | Evans et al. _____ 318—481 X |
| 3,192,463 | 6/1965 | Kyle _____ 318—473 |

FOREIGN PATENTS 483,039  4/1938  Great Britain.

ORIS L. RADER, *Primary Examiner.*

J. C. BERENZWEIG, *Assistant Examiner.*